US012630035B2

(12) United States Patent
Baeten et al.

(10) Patent No.: US 12,630,035 B2
(45) Date of Patent: May 19, 2026

(54) ELECTRIC VEHICLE CHARGER ENERGY MANAGEMENT EQUIPMENT FOR USE WITH GENERATOR BACK-UP

(71) Applicant: Generac Power Systems, Inc., Waukesha, WI (US)

(72) Inventors: Austin George Baeten, Fox Point, WI (US); Nicholas Scott Karfonta, Waterford, WI (US); Brandon Michael Schmidt, Sun Prairie, WI (US); Daniel Luke Kempema, Lake Mills, WI (US); Samuel Benjamin Desens, Madison, WI (US); Nicholas James Schmidling, Hubertus, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 105 days.

(21) Appl. No.: 18/659,584

(22) Filed: May 9, 2024

(65) Prior Publication Data

US 2024/0380206 A1     Nov. 14, 2024

Related U.S. Application Data

(60) Provisional application No. 63/501,039, filed on May 9, 2023.

(51) Int. Cl.
B60L 53/50          (2019.01)
B60L 53/63          (2019.01)
(Continued)

(52) U.S. Cl.
CPC .............. B60L 53/50 (2019.02); B60L 53/63 (2019.02); H02J 3/14 (2013.01); H02J 7/0047 (2013.01);
(Continued)

(58) Field of Classification Search
CPC ........ B60L 53/50; B60L 53/63; B60L 53/665; B60L 2240/549; B60L 2240/72;
(Continued)

(56)          References Cited

U.S. PATENT DOCUMENTS 8,478,452 B2 *  7/2013  Pratt ..................... B60L 53/305
                                                700/297
10,069,331 B2    9/2018  Pancheri
                  (Continued)

OTHER PUBLICATIONS

PSP Products, Inc., SAK-60MS, Capture from The Wayback Machine dated Dec. 9, 2022, 2 pages.
(Continued)

*Primary Examiner* — Daniel Cavallari
(74) *Attorney, Agent, or Firm* — Merchant & Gould P.C.

(57)          ABSTRACT

Systems and methods are provided for managing Electric Vehicle Supply Equipment (EVSE) for use with a generator back-up. The EVSE can receive electrical power to generate an electrical load while monitoring a frequency of electrical power. The EVSE and/or another system may determine the generator back-up is supplying power based on the frequency. In response to determining the generator back-up is supplying power, the EVSE can operate at percentage of full power. The EVSE may attempt to reconnect and/or increase the percentage of full power in multiple ways based on a mode the EVSE is operating in. In a lock-out disabled priority mode, the EVSE can attempt to reconnect and begin operating at full power. In a lock-out mode, the EVSE can attempt to reconnect at a percentage of full power and incrementally increase the percentage of full power until full power has been reached.

20 Claims, 12 Drawing Sheets

(51) Int. Cl.
　　 *H02J 3/14* 　　　　 (2006.01)
　　 *H02J 7/00* 　　　　 (2006.01)
(52) U.S. Cl.
　　 CPC ....... *H02J 2310/58* (2020.01); *Y02B 70/3225* (2013.01); *Y04S 20/222* (2013.01)
(58) Field of Classification Search
　　 CPC .. B60L 2250/10; B60L 2250/20; B60L 53/16; B60L 53/305; B60L 53/53; B60L 53/57; B60L 53/62; B60L 53/65; B60L 53/18; H02J 3/14; H02J 7/0047; H02J 2310/58; H02J 3/322; H02J 2310/48; Y02B 70/3225; Y04S 20/222
　　 See application file for complete search history.

(56) 　　　　　　 References Cited

U.S. PATENT DOCUMENTS

| | | | |
|---|---|---|---|
| 10,554,074 | B2 | 2/2020 | Pancheri |
| 11,108,265 | B2 | 8/2021 | Pancheri |
| 11,296,510 | B1 * | 4/2022 | Culbertson, II .......... H02J 9/08 |
| 11,831,197 | B2 | 11/2023 | Pancheri |
| 2011/0245987 | A1 | 10/2011 | Pratt et al. |
| 2015/0015213 | A1 | 1/2015 | Brooks et al. |
| 2016/0236584 | A1 | 8/2016 | Miftakhov et al. |
| 2017/0008413 | A1 * | 1/2017 | Reineccius ............. H02J 3/381 |
| 2018/0358839 | A1 * | 12/2018 | Perez ........................ H02J 3/46 |
| 2020/0130527 | A1 | 4/2020 | Brombach et al. |
| 2022/0258637 | A1 * | 8/2022 | Chow ..................... B60L 53/31 |
| 2023/0208184 | A1 * | 6/2023 | Bahei-Eldin ............. H02J 3/14 |
| | | | 320/109 |
| 2023/0370017 | A1 * | 11/2023 | Ginsberg-Klemmt ..................... |
| | | | H02S 40/38 |

OTHER PUBLICATIONS

Patent Cooperation Treaty International Searching Authority, PCT International Search Report and Written Opinion for Application No. PCT/US2024/028590 mailed Sep. 10, 2024, 26 pages.

* cited by examiner

*FIG. 4*
400
302
402
404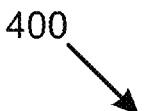
206
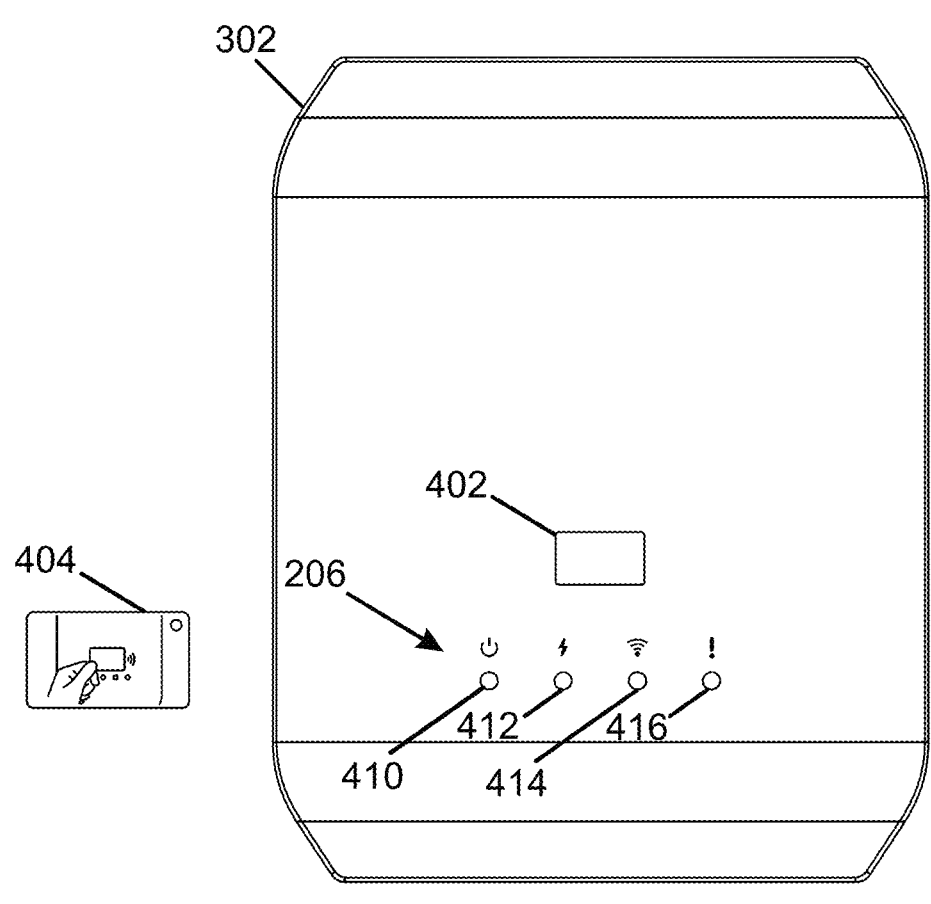
410    412    414    416

600

800

Generator System
102

Transfer Switch
802

Circuit Breaker
804

Energy
Management
Module 806

EVSE 110

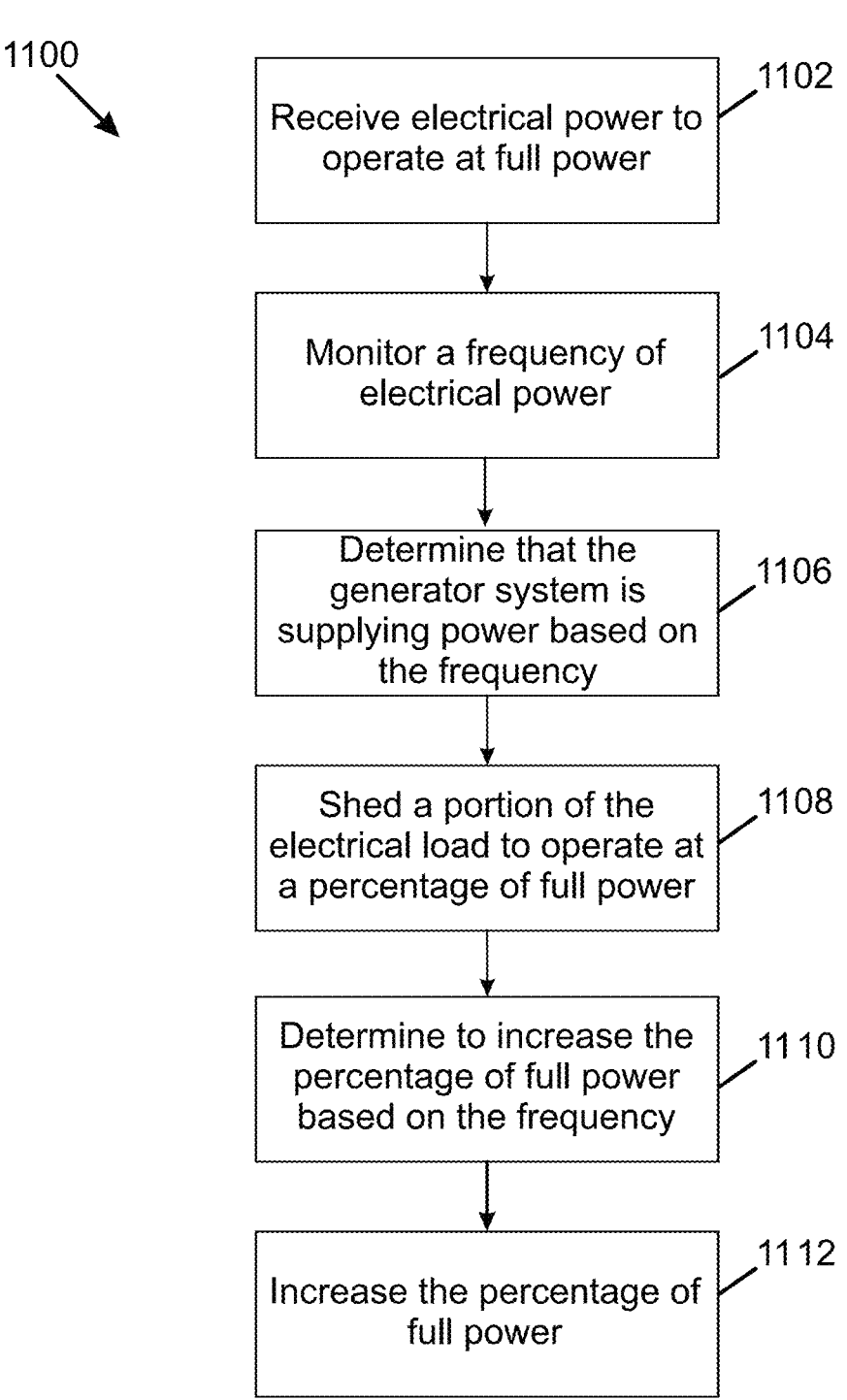

1100

Receive electrical power to operate at full power — 1102

Monitor a frequency of electrical power — 1104

Determine that the generator system is supplying power based on the frequency — 1106

Shed a portion of the electrical load to operate at a percentage of full power — 1108

Determine to increase the percentage of full power based on the frequency — 1110

Increase the percentage of full power — 1112

ELECTRIC VEHICLE CHARGER ENERGY MANAGEMENT EQUIPMENT FOR USE WITH GENERATOR BACK-UP

CROSS-REFERENCE TO RELATED APPLICATION(S)

This application claims priority to U.S. Application No. 63/501,039, filed on May 9, 2023, entitled ELECTRIC VEHICLE CHARGER ENERGY MANAGEMENT EQUIPMENT FOR USE WITH GENERATOR BACK-UP, the disclosure of which is hereby incorporated by reference in its entirety.

BACKGROUND

Most residential buildings and commercial buildings utilize electrical power received from a utility company. Ideally, utility companies will provide uninterrupted or infrequently interrupted power to their customers at proper voltage levels and line frequency. However, power outages can occur because the utility cannot meet demand and utility equipment can malfunction or break, because of inclement weather including high wind, rain, snow, ice, fires, and lightning for example. The duration of power outages can vary based on the cause and the severity of the problem, and appliances of buildings may not operate during the power outage.

Electrical generators can be used as back-up sources of energy, such as during a power outage from a utility. The electrical generators can operate in a stand-by mode, where electrical power provided by a primary source, such as from a utility, may be monitored. If the power provided by the primary source utility fails, the electrical generator back-up can automatically start operating to generate electrical power.

An electrical generator operates using fuel, such as fossil fuel (e.g., natural gas, propane, gasoline, diesel fuel), and the electrical generator can only operate as long as fuel can be supplied to the electrical generator. Additionally, the electrical generator may have a generation capacity less than the power demands the generator is responsible for. Sizing the electrical generator to have a capacity to meet power demands can be prohibitively expensive. Therefore, electrical generators may be managed to allocate the power the electrical generator can generate to supply power to certain devices and not supply power to other devices.

SUMMARY

In general terms, this disclosure is directed to managing a generator, and, particularly, Electric Vehicle (EV) charger energy management systems and methods for use with a generator back-up. The EVSE can monitor the frequency of the source power to determine if it is receiving power from a generator or a utility. If the EVSE determines that the source is generator power, the EVSE may determine if the generator is reaching full capacity. If the generator is reaching full capacity, the EVSE may reduce the EV charging load.

In some embodiments, and by non-limiting example, a method of managing an EVSE for use with a generator system comprises: receiving electrical power to operate at full power; monitoring a frequency of electrical power; determining that the generator system is supplying power based on the frequency; in response to determining the generator system is supplying power, shedding a portion of an electrical load of the EVSE to operate at a percentage of full power; determining to increase the percentage of full power based on the frequency; and in response to determining to increase the percentage of full power, increasing the percentage of full power. In certain embodiments, the electrical load is used to charge an EV. Determining the generator system is supplying power based on the frequency can comprise determining the frequency is any one of (i) below a minimum threshold frequency for a first period, or (ii) below an extreme threshold frequency for a second period. In example implementations, the minimum threshold frequency is fifty-eight Hertz (Hz), the first period is three seconds, the extreme threshold frequency is fifty-two Hz, and the second period is one half of a second.

Determining to increase the percentage of full power based on the frequency can comprise determining a magnitude of frequency dither is at or below a frequency dither threshold for a period. In some examples, the frequency dither threshold is 0.7 Hz, and the period is five minutes. Determining to increase the percentage of full power based on the frequency can comprise sampling the frequency, wherein sampling the frequency comprises sampling a sample amount; determining all of the samples of the frequency have a magnitude of frequency dither at or below a first frequency dither threshold; and determining a second portion of the samples of the frequency have the magnitude of frequency dither at or below a second frequency dither threshold. In certain examples, the sample amount is two-hundred samples, the first frequency dither threshold is 0.2 Hz, and the second frequency dither threshold is 0.07 Hz.

Monitoring the frequency can comprise determining an amount of zero-crossings during a plurality of subperiods. In example implementations, determining the generator system is supplying power based on the frequency can comprise determining a subperiod of the plurality of subperiods is below a minimum threshold amount of zero-crossings; evaluating one or more previous subperiods of the subperiod to determine whether any of the previous subperiods are below an extreme frequency threshold; and evaluating subsequent subperiods of the subperiod to determine whether the subsequent periods are below the minimum threshold. In some embodiments, the portion of the electrical load is the full electrical load, and the percentage of full power is zero percent. Determining to increase the percentage of full power based on the frequency can comprise determining the generator system is no longer supplying power based on the frequency.

In another aspect, a method of managing EVSE power supply from a generator system, comprises: receiving electrical power to operate at full power; monitoring a frequency of electrical power; determining that the generator system is supplying power based on the frequency; in response to determining the generator system is supplying power, shedding a portion of an electrical load of the EVSE to operate at a percentage of full power; delaying increasing the percentage of full power for a period; and after the period, increasing the percentage of full power. In some embodiments, the method can further comprise determining the frequency is below a threshold after increasing reception of electrical power; in response to determining the frequency is below the threshold, shedding a second portion of the electrical load to operate at a second percentage of full power; delaying monitoring the frequency for a second period; after the second period, determining the frequency is above a second threshold; and in response to determining the frequency is above the second threshold, again increasing the percentage of full power.

Increasing the percentage of full power can comprise increasing the percentage of full power by a second percentage; determining the frequency is above a threshold; and in response to determining the frequency is above the threshold, increasing the percentage of full power by a third percentage. In some examples, increasing the percentage of full power can further comprise again determining the frequency is above the threshold; and in response to determining the frequency is again above the threshold, again increasing the percentage of full power by a fourth percentage. In other examples, the method can further comprise determining the frequency is below the threshold after increasing the percentage of full power by the third percentage; and in response to determining the frequency is below the threshold, reducing increasing the percentage of full power by a fourth percentage.

In yet another aspect, a system for managing an EVSE for use with a generator system comprises: the generator system, wherein the generator system is operable to generate and supply power; and the EVSE, comprising: a controller operable to: cause the EVSE to receive electrical power to operate at full power; receive an instruction to shed an electrical load of the EVSE and reduce the electrical power received based on a frequency of electrical power powering the EVSE; determine a portion of the electrical load to shed based on the instruction; cause the EVSE to operate at a percentage of full power; delay increasing the percentage of full power for a period; and after the period, increase the percentage of full power. In some embodiments, the system further comprises a power monitor operable to monitor the frequency of the electrical power powering the EVSE. In example implementations, the power monitor sends the instruction to operate at the percentage of full power.

In certain embodiments, the system further comprises an energy management module operable to: monitor the frequency of the electrical power powering the EVSE; and send the instruction to shed the electrical load. In further embodiments, the system further comprises an energy monitoring system operable to: monitor the frequency of the electrical power powering the EVSE; and send the instruction to operate at the percentage of full power. In some examples, the system further comprises a source operable to supply power to the EVSE, wherein: the energy monitoring system is operable to send an amount of power the source is able to supply the EVSE; and the controller is operable to cause the EVSE to operate at a new percentage of full power equal to or less than the amount of power the source is able to supply the EVSE.

In some embodiments, the system further comprises a user device, wherein: the EVSE further comprises a wireless communication module operable to send information to the user device and receive information from the user device; the controller is operable to send information associated with the EVSE to the user device via the wireless communication module; and the user device, using the information associated with the EVSE, is operable to: display a graphical user interface comprising any one of (i) a charge load indicator, (ii) a charge selectable input, (iii) a connection indicator, (iv) a charging status indicator, (v) a menu, (vi) a lock-out mode input, (vii) a priority mode input, (viii) a priority level input, (ix) an initial load shed target input, (x) an EVSE disconnect input, (xi) an EVSE reconnect input, or (xii) any combination of (i)-(xi). In example implementations, the user device is operable to send a command to the EVSE to control the operation of the EVSE; and the controller is operable to receive the command via the wireless communication module and adjust the operation of the EVSE by any one of (i) changing the percentage of full power the EVSE is operating at, (ii) shedding the load, or (iii) attempting to reconnect to power.

BRIEF DESCRIPTION OF THE DRAWINGS

FIG. 4 is a block diagram of a second view of the example EVSE of FIG. 1.

FIG. 11 is a flowchart of an example method of managing an EVSE.

DETAILED DESCRIPTION

Figure 1:
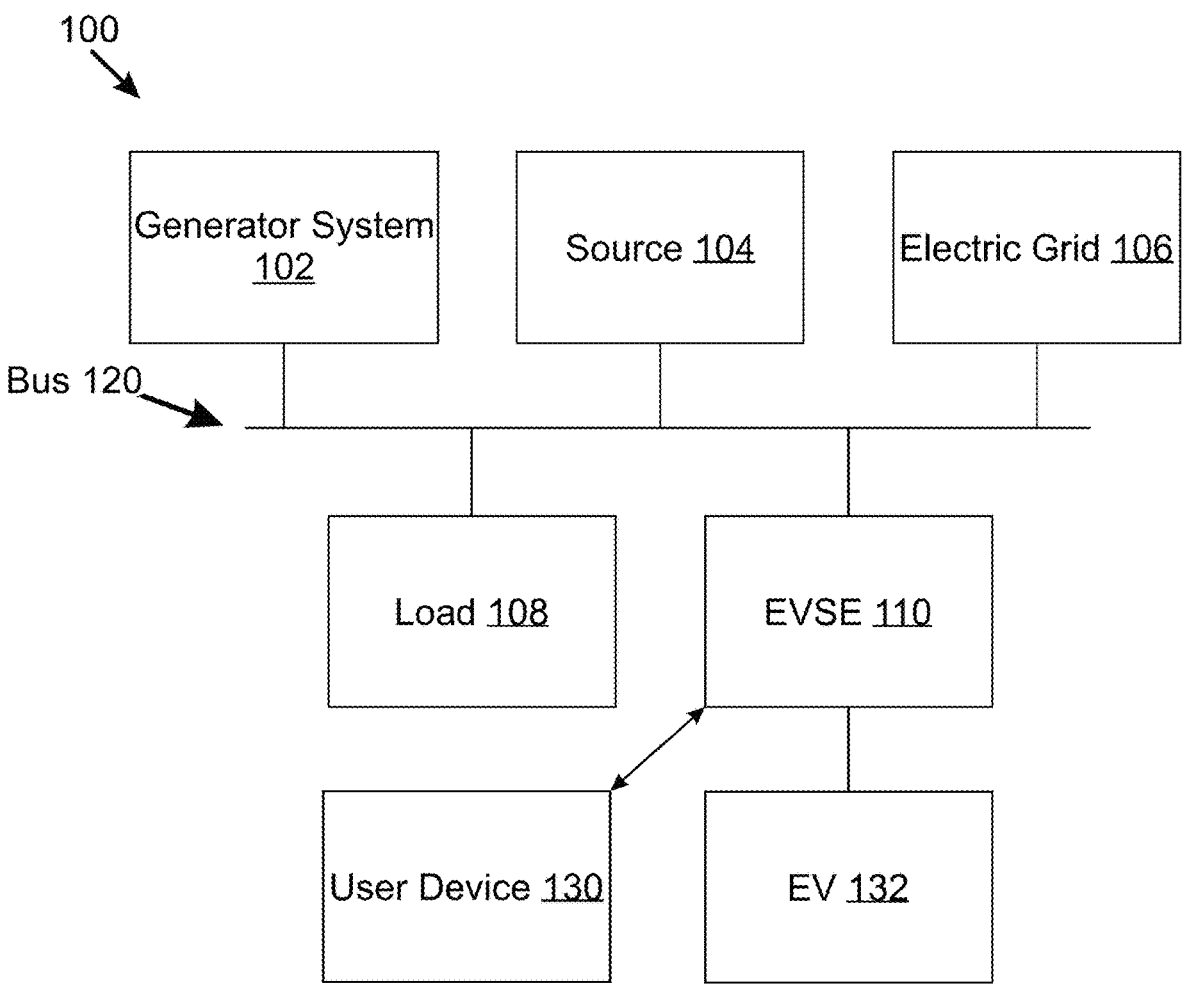
FIG. 1 is a schematic view of an operating environment for managing an Electric Vehicle (EV) Supply Equipment (EVSE) for use with a generator back-up.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Systems and methods for managing an Electric Vehicle (EV) charger, also referred to as EV Supply Equipment (EVSE), for use with a generator back-up are described herein. Managing an EVSE for use with a generator back-up can include causing the EVSE to shed the electrical load entirely or reduce the load by a percentage of the EVSE's full output load when receiving power from a generator back-up. An algorithm can be implemented to determine whether the EVSE is receiving power from a generator back-up by monitoring the frequency of the received power. The algorithm may determine that a generator back-up is supplying power when the frequency drops. Once it is determined that the generator back-up is supplying power, the EVSE will shed its load and reconnect at a reduced load or full load based on the generator back-up's capacity and whether power from another source (e.g., a utility) is restored.

A user may set the EVSE's load in one or more modes, and the modes will affect the operation of the EVSE when attempting to reconnect at a reduced load or full load. For example, the user may set the EVSE in priority or lock-out mode, and the EVSE would shed the full load when a generator is in use. In the lock-out mode, the EVSE will attempt to reconnect and begin receiving power at full load. Thus, the EVSE may be unable to reconnect power until the main power source has been restored. In the priority mode, the EVSE will attempt to reconnect at a reduced power and incrementally increase the percentage of full power until the full load has been reached. Therefore, the EVSE may operate at a percentage of full power while the generator back-up is supplying power without overloading the generator. The EVSE may have an assigned priority when operating in the priority mode. The priority indicates when the EVSE should receive power compared to other loads that receive power. The EVSE can provide full, reduced, or no load when the generator is the main power source and all other managed circuits of lower priority have been shed to keep the high priority loads powered. A user may adjust the current level in which the EVSE can supply generator power to the EV in this mode.

A load shedding algorithm may manage the reduction of load that is provided to the EVSE without a user having to adjust the output power between shedding events. The load shedding algorithm can optimize the EVSE output current to the size of the generator, allowing the EVSE to operate at the highest percentage of full power possible without overloading the generator. Thus, the systems and methods for managing an EVSE may determine when to cause the EVSE to shed its load and determine how the EVSE should begin reconnecting to receive power.

Monitoring the power, such as monitoring the frequency, to determine when the EVSE should shed its load, operate at a percentage of full power, etc., can include checking the power in an interval (e.g., every millisecond). If the voltage has gone from positive to negative, or negative to positive, since the last interval, a zero crossing is counted. Every one eighth of a second, or 125 ms, the zero-crossing count can be collected and accumulated into a total zero-crossing count over the last four collections, accounting for a half-second of zero-crossings. This half-second zero-crossing count can be logged. Six contiguous half-second counts can be collected for the frequency evaluation.

There may be two different frequency thresholds for the EVSE shedding its load, a minimum threshold and an extreme threshold. These thresholds may define whether the generator system can handle the currently applied load and whether the EVSE will shed its load. The minimum frequency threshold for sixty Hertz (Hz) generators can be fifty-eight Hz, two Hz from nominal. The extreme threshold can be fifty Hz, ten Hz from nominal. For fifty Hz generators, the minimum frequency threshold can be forty-eight Hz, two Hz from nominal, and the extreme threshold can be forty Hz, ten Hz from nominal.

If the most recent half-second zero crossing count is below the minimum frequency threshold, the EVSE and/or another monitoring system may check the previous half-second zero-crossing counts. If any of the previous half-second counts (e.g., the last six half-second counts) are below the extreme threshold, the EVSE will shed its. If the frequency remains below the minimum threshold for the next three seconds, the EVSE will shed the load. If the frequency recovers, or increases, or if the frequency rises above the minimum threshold over the next three seconds, the EVSE will not shed the load, and consider the decrease in frequency a false alarm.

In some examples, when monitoring the power, the EVSE may determine the generator system cannot accommodate the loads that are supposed to receive power (e.g., as indicated by a priority level assigned to the loads). The EVSE may supply power via a connected EV to supply power to the load that are supposed to receive power to supplement the power the generator system provides.

FIG. 1 is a schematic view of an operating environment 100 for managing an EVSE for use with a generator back-up. The operating environment 100 includes a generator system 102, a source 104, an electric grid, a load 108, an EVSE 110, a bus 120, a user device 130, and an EV 132. The generator system 102, the source 104, the electric grid 106, the load 108, and the EVSE 110 can supply and/or receive electric power via the bus 120. In an example, the bus 120 is an electric connection for a single-family home, an apartment complex, a commercial building, or some other building or complex. In additional embodiments, more or fewer systems may be connected to the bus 120 (e.g., multiple generator systems, multiple sources, multiple loads, and/or multiple EVSEs).

The generator system 102 may be a generator back-up capable of generating and supplying power, such as when power from the electric grid 106 is stopped. The source 104 may be any system that generates and supplies power. For example, the source 104 may be a photovoltaic system, a wind turbine, or some other system that generates power. The electric grid 106 may be associated with a utility and supply power. The load 108 may be any system that receive power, such as an appliance, an electronic, a Heating, Ventilation, and Air Conditioning (HVAC) system, and the like.

The EVSE 110 is a charger for supplying power to the EV 132. The EVSE 110 can shed its load and reconnect its load in response to the generator system 102 operating to supply power via the bus 120. The user device 130 is any device (e.g., a smart phone, a tablet, a personal computer) that a user may operate. The user may use the user device 130 to control the operation of the EVSE 110. The EVSE 110 can include components for monitoring when the generator system 102 is operating to determine when to shed the load and for reconnecting to power in some embodiments, described in more detail with respect to FIG. 2. In other embodiments, the EVSE 110 can communicate with separate monitoring systems to determine when to shed the load and for reconnecting power, described in more detail with respect to FIGS. 8, 9, and 10.

Figure 2:
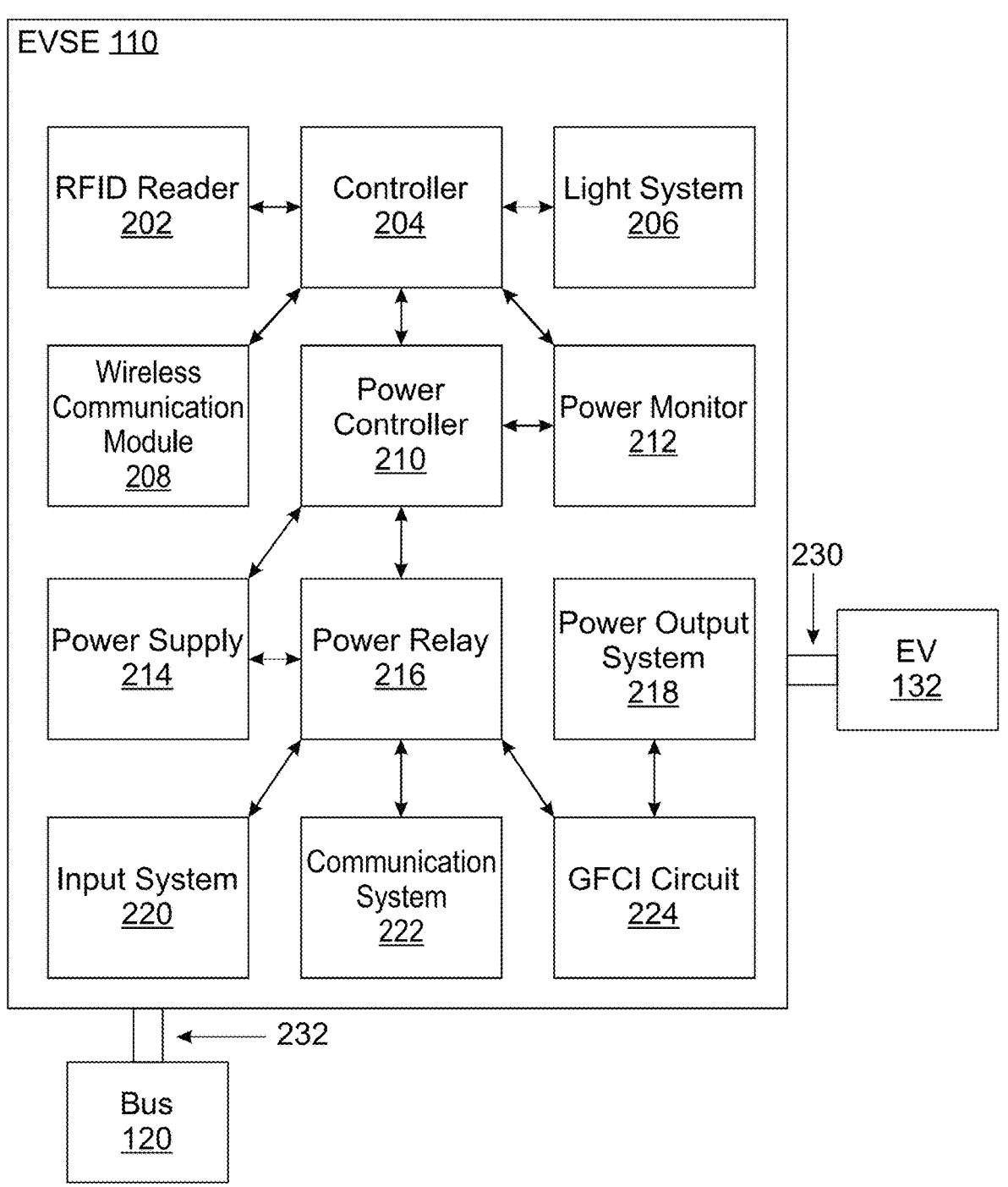
FIG. 2 is a schematic view of an example EVSE of FIG. 1.

FIG. 2 is a schematic view of the example EVSE 110. The EVSE 110 includes a Radio Frequency Identification (RFID) reader 202, a controller 204, a light system 206, a wireless communication module 208, a power controller 210, a power monitor 212, a power supply 214, a power relay 216, a power output system 218, an input system 220, a communication system 222, and a Ground Fault Circuit Interrupter (GFCI) circuit 224. The EVSE 110 may connect to the EV 132 via a first connection 230 and connect to the bus 120 via a second connection 232.

The RFID reader 202 can send Radio Frequency (RF) signals to external devices and receive RF signals from external devices. The RFID reader 202 can receive RF signals to identify a user and/or EV, such as the EV 132. The RFID reader 202 may identify a user and/or EV to track the power consumption associated with the user and/or EV.

The controller 204 may control the operation of the components of the EVSE 110, such as the RFID reader 202, the light system 206, the wireless communication module 208, the power controller 210, and the like. The light system 206 may include one or more indicator lights to indicate the operating state of the EVSE 110 to a user. For example, the light system 206 can include indicator lights to indicate whether the EVSE 110 is connected to power, whether the EVSE 110 is charging the EV 132, whether the EVSE 110 is connected to a network for communications, whether the EVSE 110 has an error, and the like.

The wireless communication module 208 enables the EVSE 110 to communicate wirelessly with other systems, such as the user device 130. The wireless communication module 208 can include components for cellular communications, wireless network communications (e.g., Wi-Fi), and/or other wireless communications. The controller 204 can send information to the user device 130 via the wireless communication module 208, such as the operating state of the EVSE 110, the current charge of the EV 132, and the like. The controller 204 can receive instructions from the user device 130 via the wireless communication module 208, such as a mode for the EVSE 110 to operate in, to initiate or stop charging the EV 132, and the like.

The power controller 210 can control the operation of components that manage the reception of power from the bus 120 and routing the power to the EV 132. For example, the power controller 210 can control the power supply 214, the power relay 216, the power output system 218, and the like. The power controller 210 may adjust the operation of components that manage the reception of power based on the operating mode of the EVSE 110 (e.g., lock-out mode enabled, lock-out mode disabled, priority level, etc.), the operating temperature of the components, voltage measurements, current measurements, and the like.

The power monitor 212 can monitor the characteristics of the power the EVSE 110 receives via the bus 120. For example, the power monitor 212 may monitor the frequency of the power. The power monitor 212 may determine when the frequency drops while monitoring the power, and the power monitor 212 may notify or otherwise send information to the controller 204 indicating that the frequency drops. The controller 204 and/or the power monitor 212 may determine that the generator system 102 is operating based on the drop in frequency. Thus, the controller 204 may cause the EVSE 110 to shed a portion or all of the electrical load, thereby reducing or stopping the power the EVSE 110 receives from the bus 120.

The power supply 214 can power the components of the EVSE 110, such as the power controller 210 and the controller 204. The power supply 214 may be a battery or some other source of power separate from the power received from the bus 120 so the EVSE 110 can operate when power is not received via the bus 120. The power relay 216 can route power to the power supply 214 to charge the power supply 214 when the EVSE 110 is receiving power from the bus 120.

The power relay 216 can open or close circuitry to allow the EVSE 110 to charge the EV 132 or prevent the EVSE 110 from charging the EV 132. The power relay 216 may also control sending power to the power supply 214 to charge the power supply 214.

The power output system 218 may be circuits and components for charging the EV 132 via the first connection 230. For example, the power output system 218 may control the voltage and current output of the EVSE 110 to appropriately provide power to the EV 132 for charging the EV 132.

The input system 220 may control the reception of power from the bus 120 via the second connection 232. For example, the input system 220 may control the voltage and current input of the EVSE 110 to prevent damage to the components of the EVSE 110. The input system 220 may also control shedding the power received from the bus 120. The GFCI circuit 224 can break a circuit when the power is leaking current to ground to protect the EVSE 110, the EV 132, and/or users. The EVSE 110 may also include a manual switch for changing the operating mode without having to use an external device (e.g., the user device 130) to change modes.

The communication system 222 can include components for connecting to devices. The devices that connect via the communication system 222 can include devices that may monitor the characteristics of the bus 120, such as frequency, power consumption, power generation, etc. The communication system 222 can include ports for cable connections, such as RS-485 connections, Universal Serial Bus (USB) connections, and the like.

Figure 3:
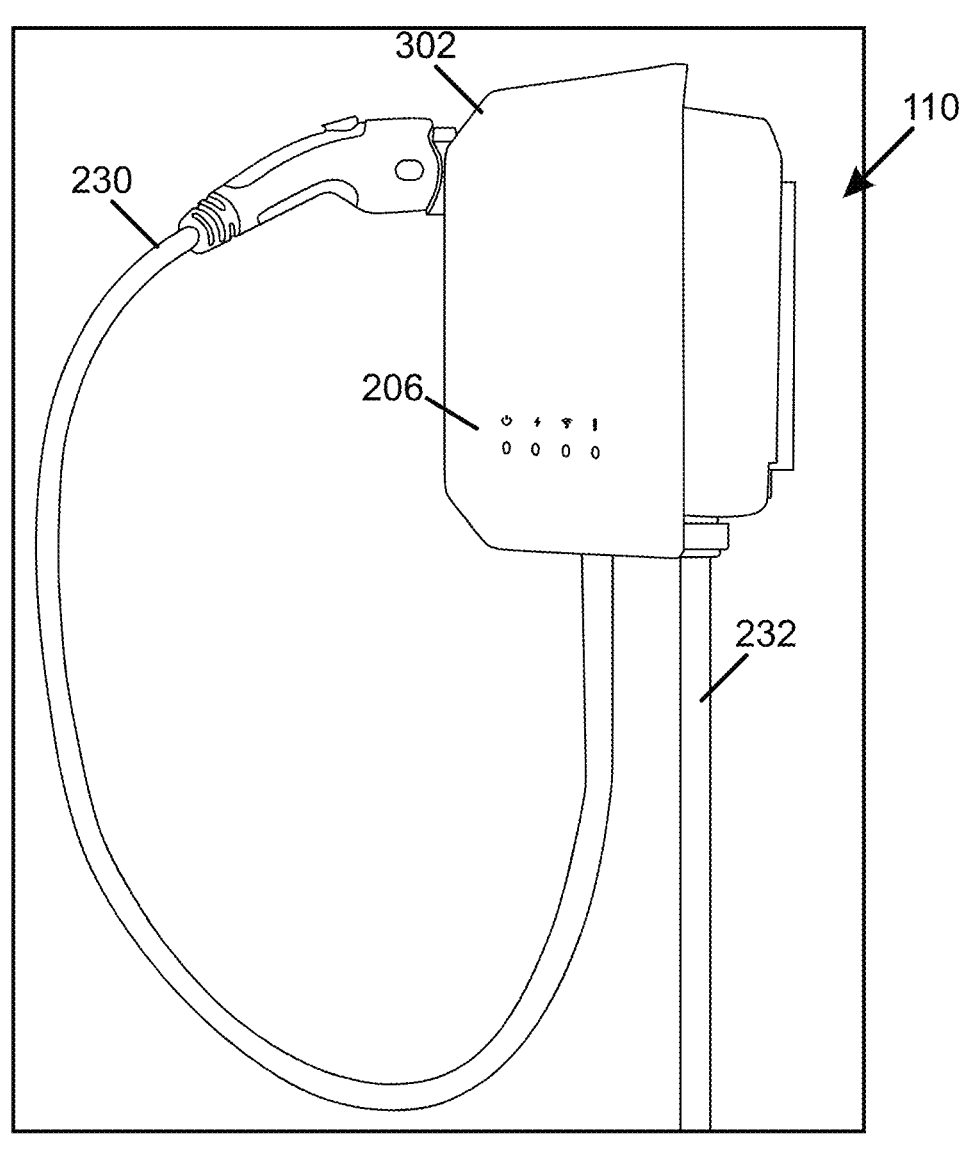
FIG. 3 is a block diagram of first view of the example EVSE of FIG. 1.

FIG. 3 is a block diagram of first view 300 of the example EVSE 110. The first view 300 of the EVSE 110 includes the first connection 230, the second connection 232, an enclosure 302, and the light system 206 integrated into the enclosure 302.

As shown in FIG. 3, the first connection 230 includes a cord and a plug for connecting to the EV 132. The plug may be any plug, such as a standardized connection, for connecting to the EV 132. The first connection 230 is disconnectable from the EV 132, and FIG. 3 illustrates the first connection 230 as stored and not connected to the EV 132.

The enclosure 302 contains the components of the EVSE 110, including the RFID reader 202, the controller 204, the light system 206, the wireless communication module 208, the power controller 210, the power monitor 212, the power supply 214, the power relay 216, the power output system 218, the input system 220, the communication system 222, and the GFCI circuit 224. The enclosure 302 may be mounted to be positioned close to a space for the EV 132, such as on a wall in a garage.

FIG. 4 is a block diagram of a second view 400 of the EVSE 110. The second view 400 illustrates a front view of the enclosure 302. The enclosure 302 includes an RFID location indicator 402. The second view 400 also illustrates an RFID badge 404.

The light system 206 is integrated into the enclosure 302 so one or more indicator lights can be viewed without opening the enclosure 302. The indicator lights may indicate the state of the EVSE 110 via different colored lights (e.g., green, yellow, orange, red, etc.), patterns of lights (e.g., blinking on and off every second, blinking on and off every five seconds, etc.), and/or the like. The indicator lights include a power indicator 410, an EV connection indicator 412, a communication indicator 414, a warning indicator 416, and the like. The power indicator 410 can indicate that the EVSE 110 is receiving power and can charge the EV 132. The EV connection indicator 412 can indicate that the EV 132 is connected, the EV 132 is connected and receiving power, the EV 132 is connected but not receiving power, the EV 132 is connected and has completed charging, and the like. The communication indicator 414 may indicate that the EVSE 110 is connected to a network for communicating with devices (e.g., the user device 130), the EVSE 110 is connected to the network but has a poor connection, the EVSE 110 is not connected to the network, and the like. The warning indicator 416 can indicate that the EVSE 110 has an error. A user may use the user device 130 to determine the error.

A user may control the operation of the EVSE 110 by placing the RFID badge 404 at the RFID location indicator 402. When the user places the RFID badge 404 at the RFID location indicator 402, the RFID reader 202 may receive a signal from the RFID badge 404. The signal may identify the user and/or an associated EV (e.g., the EV 132). The EVSE 110 may only supply power to a connected EV when the signal has been received. The identification of the user and/or EV may be used to track the amount of power the user and/or EV may receive from the EVSE 110, such as for billing the user for the power received or only allowing authorized users and/or EVs to use the EVSE 110.

Figure 5:
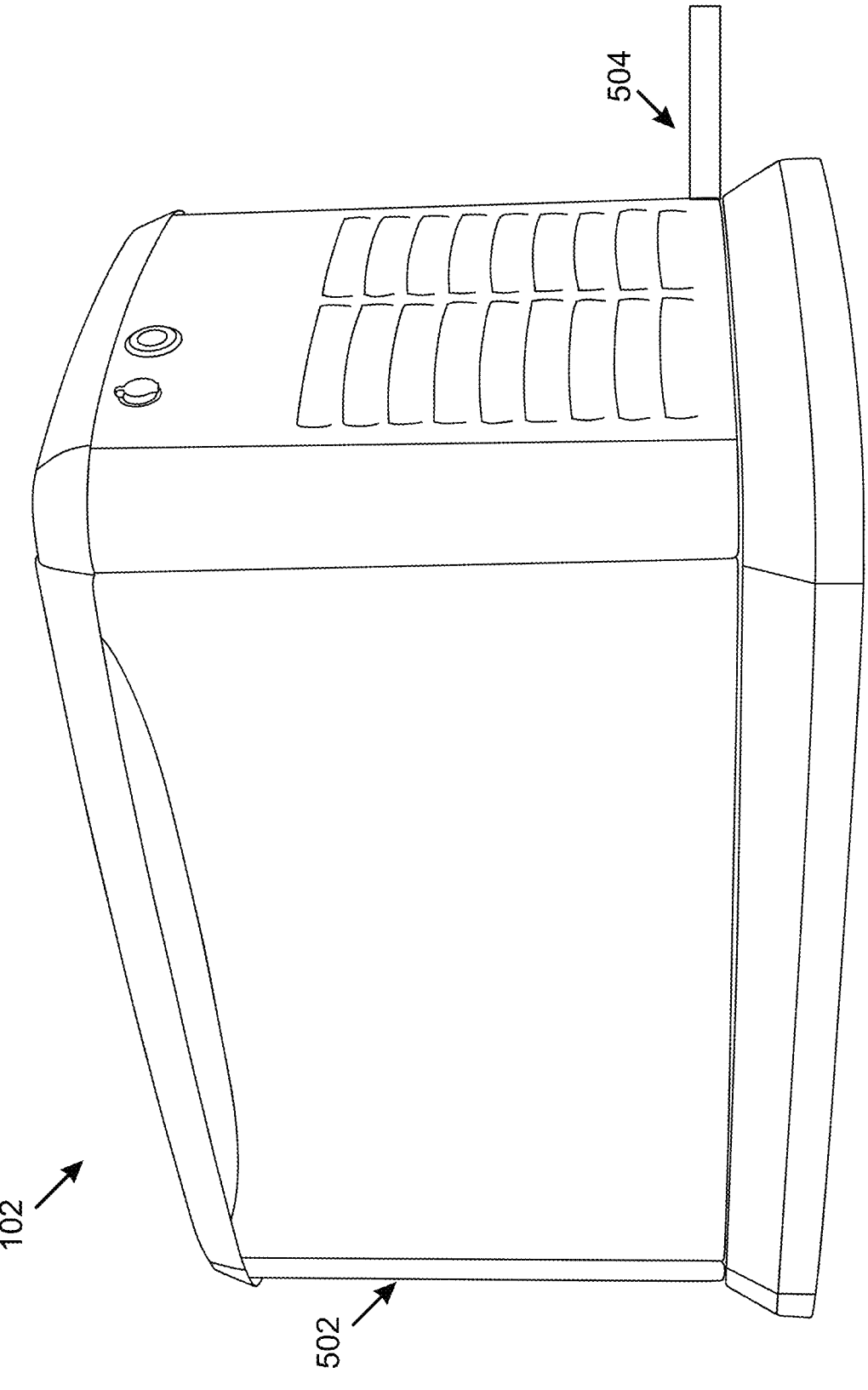
FIG. 5 is a is illustration of a generator system of FIG. 1.

FIG. 5 is a is an illustration of the generator system 102. The generator system 102 includes a generator enclosure 502 and a generator connection 504. The generator enclosure 502 contains the components of the generator. The generator connection 504 connects the generator to the bus 120.

Figure 6:
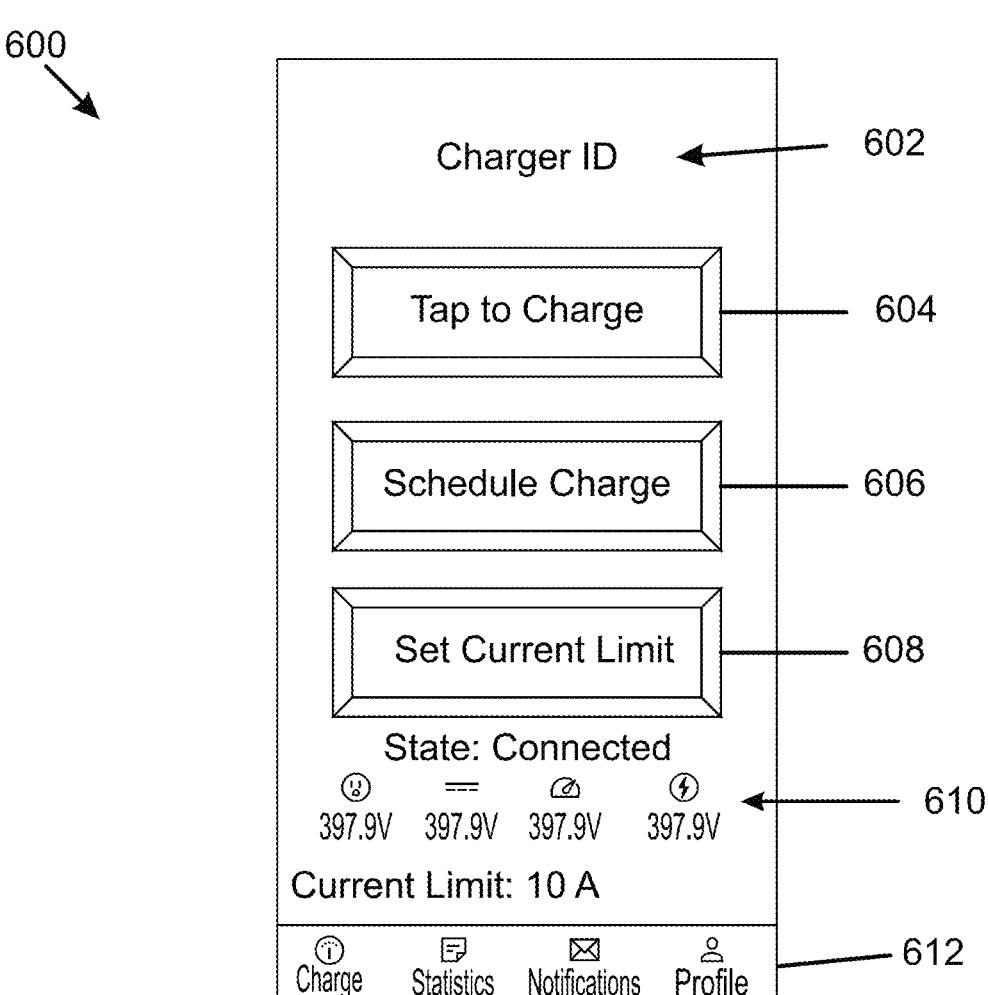
FIG. 6 is a block diagram of a Graphical User Interface (GUI) for controlling the example EVSE of FIG. 1.

FIG. 6 is a block diagram of a Graphical User Interface (GUI) 600 for controlling the EVSE 110. The GUI 600 can be displayed on a device for user review and input, such as on the user device 130. For example, the user may interact with the GUI 600 via the user device 130 to adjust the operation of the EVSE 110, view the operating state of the EVSE 110, and the like. The GUI 600 includes a charger Identifier (ID) 602, a charge selectable input 604, a schedule charge selectable input 606, a current limit selectable input 608, charging status indicators 610, and a menu 612.

The charger ID 602 identifies the EVSE 110. For example, the user may identify the EVSE 110 to ensure that the user is controlling and/or viewing information for the correct EVSE. The charge selectable input 604 is selectable by a user to cause the EVSE 110 to initiate or terminate charging the EV 132. The schedule charge selectable input 606 is selectable by a user to schedule a period for the EVSE 110 to charge the EV 132 and/or additional EVs. The current limit selectable input 608 is selectable for a user to set a current limit for the EVSE 110. A current limit may be applied for when the EVSE 110 receives power from the electric grid and another current limit may be applied when the EVSE 110 receives power from the generator system 102.

The charging status indicators 610 can be indicators of the EVSE 110 and/or the EV 132. For example, the charging status indicators 610 can include a power source indicator indicating the power available to the EVSE 110, a charging capability indicator indicating the power available for the EVSE 110 to supply to the EV 132, a time to charge indicator indicating the estimated time for the EVSE 110 to charge the EV 132 to full power, a current charge indicator indicating the current charge of the EV 132, and/or the like. A connection indicator can indicate the status of the connection between the EVSE 110 and the EV 132, and the connection indicator can indicate that the EVSE 110 is connected to the EV 132, disconnected from the EV 132, connected to the EV 132 but there is an error in the connection, and the like.

The menu 612 includes selectable inputs to view other GUIs for controlling and monitoring the operation of the EVSE 110. For example, the menu 612 may include selectable inputs for viewing the GUI illustrated by FIG. 7

Figure 7:
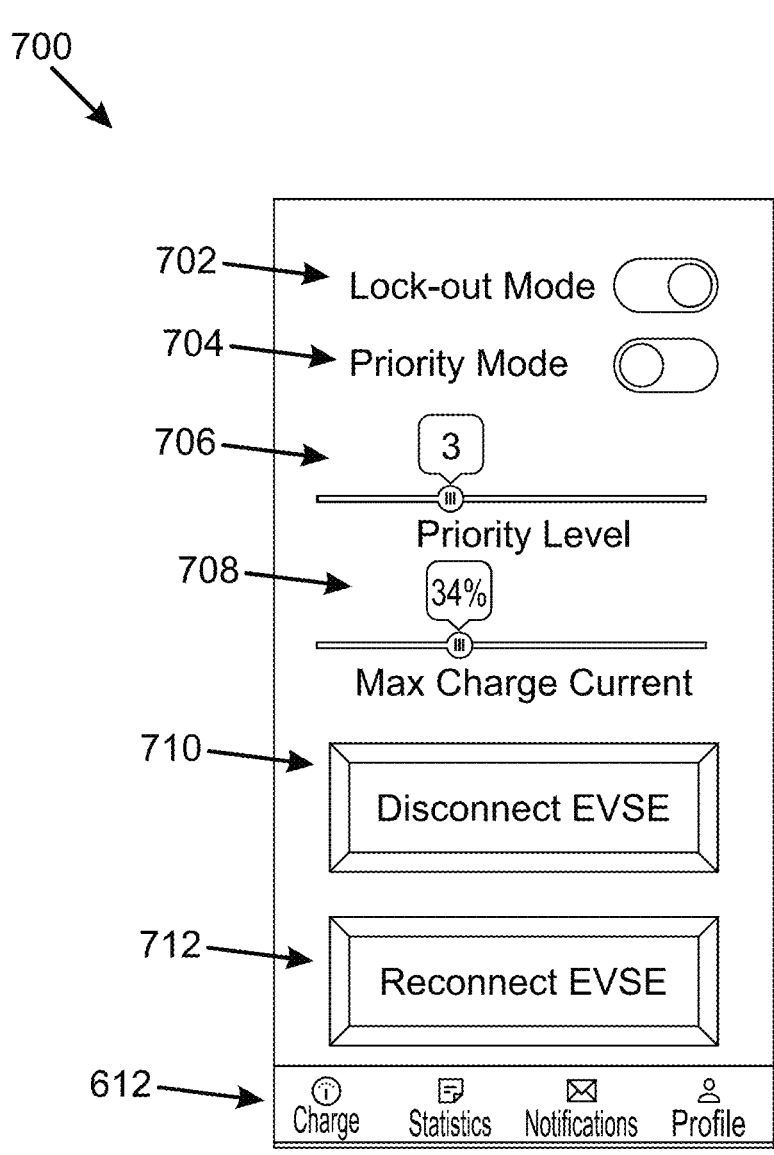
FIG. 7 is a block diagram of an additional GUI for controlling the example EVSE of FIG. 1.

FIG. 7 is a block diagram of an additional GUI 700 for controlling the EVSE 110. The additional GUI 700 includes a lock-out mode input 702, a priority mode input 704, a priority level input 706, a max charge current target input 708, an EVSE disconnect input 710, an EVSE reconnect input 712, and the menu 612. The additional GUI 700 can be displayed by the user device 130 and allow a user to adjust the operation of the EVSE 110, view the operating state of the EVSE 110, and the like. The menu 612 is selectable for viewing other GUIs such as the GUI 600.

The lock-out mode input 702 is selectable to turn on and turn off the lock-out mode for the EVSE 110. The additional GUI 700 displays the EVSE 110 as in the lock-out mode in this example. When the lock-out mode input 702 is turned on, certain inputs may be disabled, such as the priority level input 706 and the max charge current target input 708. The priority mode input 704 is selectable to turn on and turn off the priority mode of the EVSE 110. The additional GUI 700 displays the EVSE 110 as not in the priority mode in this example. The priority level input 706 is adjustable or otherwise selectable to set the priority level of the EVSE 110 when the priority mode is on. The priority level may indicate the priority the EVSE 110 has to reconnect to power when the generator system 102 operates. For example, the priority level may be a range from one to eight, and a priority level of one may indicate that the EVSE 110 is a low priority and should only reconnect to power if there is additional power available after other devices receive power (e.g., the load 108). A priority level of eight may indicate that the EVSE 110 is a top priority and should reconnect to power as soon as possible. Additionally, the load 108 and/or other devices may also be assigned a priority level. If the load 108 has a higher priority level than the EVSE 110, the EVSE 110 will not reconnect to power or operate at a portion of maximum operating power while the load 108 receives power. The controller 204 can adjust the portion of power the EVSE 110 reduces by and/or determine the length of the period to increase power consumption and increase the load when the generator system 102 is operating based on the priority level.

The max charge current target input 708 is adjustable or otherwise selectable to cause the controller 204 to determine the target max charge current or power reduction when the generator system 102 begins operating. The additional GUI 700 illustrates the initial load shed max charge current target as thirty-four percent of the maximum load in this example. Thus, when the controller 204 determines that the generator system 102 begins operating, the controller 204 may cause the EVSE 110 to shed its load to operate at thirty-four percent of maximum load. In another embodiment, the max charge current target is the target for the EVSE 110 to eventually operate at while the generator system 102 is operating at. Thus, the EVSE 110 may first operate at a percentage of maximum load below the max charge current target.

In additional examples, the EVSE 110 may determine a maximum load associated with the EV 132. For example, the EVSE 110 may have a maximum load of twenty-four Amperes (A) when charging the EV 132. The maximum load is therefore twenty-four A, and the percentage of maximum load would be the percentage of twenty-four A in this example.

The EVSE disconnect input 710 is selectable to cause the EVSE 110 to shed its load and stop charging the EV 132. The EVSE reconnect input 712 is selectable to cause the EVSE 110 to reconnect to power and begin charging the EV 132. In some examples, the EVSE 110 will attempt to reconnect at full power. In other examples, the EVSE 110 will attempt to reconnect at a percentage of full power, determine whether the generator system 102 can accommodate the EVSE 110 operating at the percentage of full power, and increase or decrease the percentage of full power based on what the generator system 102 can accommodate.

Figure 8:
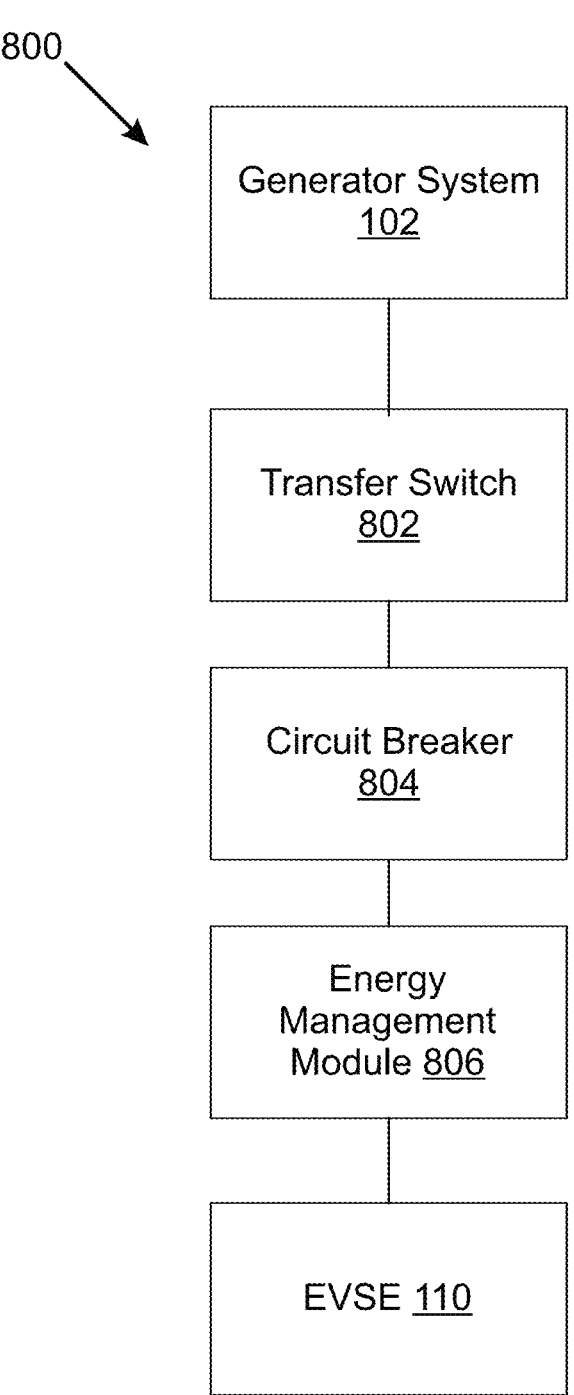
FIG. 8 is a schematic view of a first configuration for managing the example EVSE of FIG. 1.

FIG. 8 is a schematic view of a first configuration 800 for managing the EVSE 110. The first configuration 800 includes the generator system 102, a transfer switch 802, a circuit breaker 804, an energy management module 806, and the EVSE 110.

The transfer switch 802 may control the connection or disconnection by the generator system 102 to the circuit breaker 804 and/or step-up or step-down the voltage of the electricity. For example, the transfer switch 802 may control the connection of the generator system 102 to the bus 120 when the electric grid 106 is not supplying power and disconnection when the electric grid 106 is supplying power. The circuit breaker 804 may allow power to flow to the energy management module 806 and the EVSE 110. The circuit breaker 804 may interrupt the power flow if current leaks to ground.

The energy management module 806 can monitor the power on the bus 120. Thus, the EVSE 110 may not directly monitor the frequency of the power in some examples and instead receive data from the energy management module 806. The energy management module 806 may send data to the EVSE 110 wirelessly (e.g., via the wireless communication module 208) or via a wired connection (e.g., via the communication system 222). The controller 204 may receive the data from the energy management module 806 to determine the frequency of the power.

In the first configuration 800, when the EVSE 110 is operating in the lock-out mode, the EVSE 110 may not reconnect to power until the generator system 102 stops operating. Thus, the EVSE 110 may monitor the frequency of the power on the bus 120, via the energy management module 806 for example, to determine when the generator system 102 stops operating and then reconnect to power.

When the EVSE 110 is operating in the priority mode, the EVSE 110 may attempt to reconnect to power at a percentage of the full power of the EVSE 110 while the generator system 102 operates. The EVSE 110, via the energy management module 806 for example, may monitor the frequency of the power on the bus 120 to determine whether the generator system 102 can accommodate the EVSE 110 operating at the percentage of full power. If the EVSE 110 determines the generator system 102 cannot accommodate the percentage of full power, the EVSE 110 may reduce the percentage of full power and again determine if the generator system 102 can accommodate the reduced percentage of full power. The EVSE 110 may incrementally reduce the percentage of full power until the EVSE 110 is operating at zero percent of full power and therefore not charging the EV 132. If the generator system 102 can accommodate the percentage of full power, the EVSE 110 may attempt to incrementally increase the percentage to full power while monitoring the frequency of the bus 120 to determine what the generator system 102 can accommodate. The generator system 102 may be able to accommodate the EVSE 110 operating at full power or a final percentage of full power that the EVSE 110 will operate at until the generator system 102 stops operating.

In an example, when the EVSE 110 is operating in the priority mode, the EVSE 110 may shed its load to operate at a percentage of full power (e.g., zero percent, ten percent, twenty percent, etc.) for a period (e.g., five minutes). The EVSE 110 may then attempt to increase the percentage of full power while monitoring the frequency of power. If the frequency drops below two Hertz (Hz) of the nominal frequency (e.g., sixty HZ), the EVSE 110 may reduce the percentage of full power and maintain the reduced percentage of full power for a period. In some examples, the EVSE 110 may send instructions to the user device 130 for the user to adjust the target load of the EVSE 110 before attempting to reconnect to power. After the period, if the frequency is within 1.9 Hz of the nominal frequency, the EVSE 110 may attempt to reconnect to power. In some examples, if the frequency again drops below two Hz of the nominal frequency, the EVSE 110 may shed its load for a longer period (e.g., thirty minutes) before attempting to reconnect. In some examples, the EVSE 110 may monitor the power without communicating with the energy management module 806.

Figure 9:
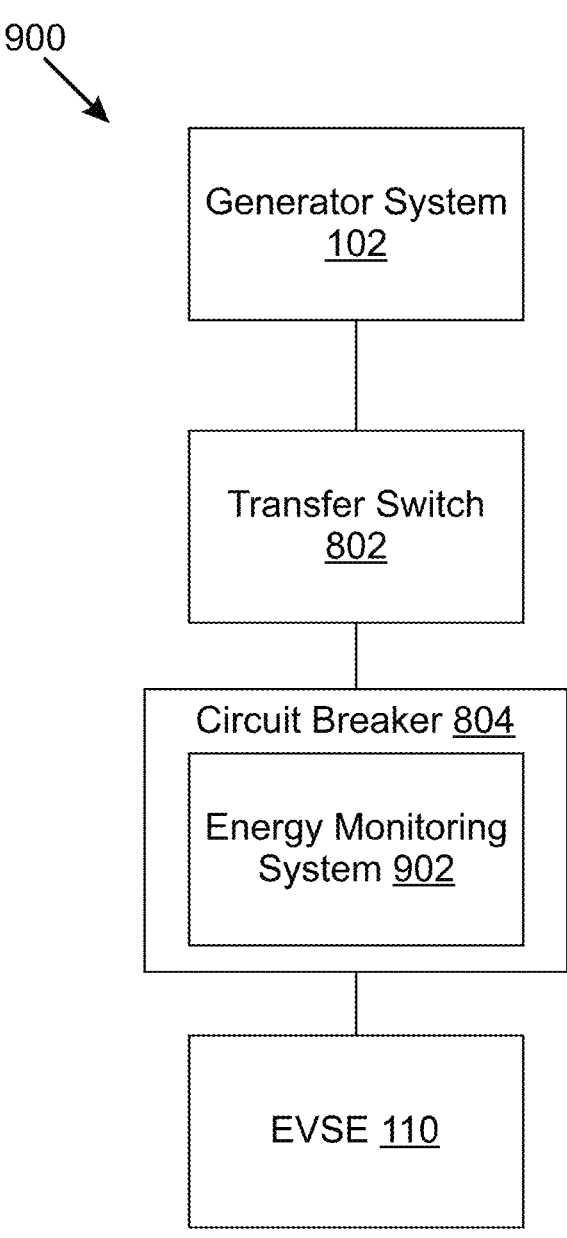
FIG. 9 is a schematic view of a second example configuration for managing the example EVSE of FIG. 1.

FIG. 9 is a schematic view of a second configuration 900 for managing the EVSE 110. The second configuration 900 includes the generator system 102, the transfer switch 802, the circuit breaker 804, an energy monitoring system 902, and the EVSE 110. The energy monitoring system 902 may be installed in the circuit breaker 804 to monitor the power. Thus, the EVSE 110 may not directly monitor the power in this example and instead receive data from the energy monitoring system 902.

The energy monitoring system 902 may store information associated with the generator system 102 such as the maximum power output and the capacity. The energy monitoring system 902 may also store information associated with the electric grid 106, such as the capacity and the maximum power output. The energy monitoring system 902 may send information to the EVSE 110, via a connection to the communication system 222 for example, indicating whether the total current on the bus 120 is over eighty percent of the electric grid 106 capacity when the generator system 102. If the current is over eighty percent of the electric grid 106 capacity, the EVSE 110 may decrease the percentage of power the EVSE 110 is operating at. The energy monitoring system 902 may also or alternatively send data to the EVSE 110 indicating when the total current is approaching the generator system 102 capacity, and the EVSE 110 may reduce the percentage of full power the EVSE 110 is operating at in response. In some examples, the EVSE 110 may store information associated with the electric grid 106 and/or the generator system 102 without communicating with the energy monitoring system 902. Thus, the EVSE 110 may determine if the current is reaching eighty percent of the electric grid 106 capacity and/or the current is reaching the maximum capacity of the generator system 102 without the energy monitoring system 902.

Figure 10:
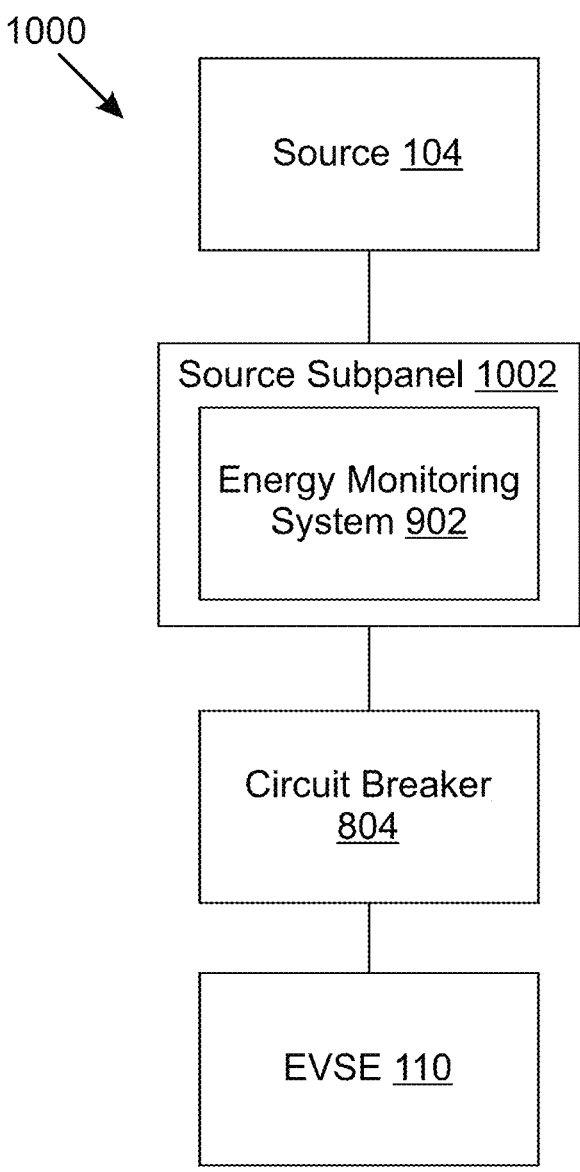
FIG. 10 is a schematic view of a third example configuration for managing the example EVSE of FIG. 1.

FIG. 10 is a schematic view of a third configuration 1000 for managing the EVSE 110. The third configuration 1000 includes the source 104, a source subpanel 1002, the circuit breaker 804, the energy monitoring system 902, and the EVSE 110. The source 104 may generate power, and the source subpanel 1002 may control the flow of power to other devices connected to the bus 120 (e.g., the EVSE 110).

The energy monitoring system 902 may determine the generation capacity of the source 104 and inform the EVSE 110. The EVSE 110 may then operate at a percentage of power equal to or less than the generation capacity of the source 104. Thus, when the generator system 102 is operating, the EVSE 110 may not be increasing the load on the generator system 102 by using the power generated by the source 104. The source 104 may be a system that intermittently generates power, such as a photovoltaic system that generates power when exposed to sunlight. Thus, the EVSE 110 may not operate if the source 104 is not producing power while the generator system 102 is operating. In some examples, the EVSE 110 may monitor the power generation of the source 104 without communicating with the energy monitoring system 902, so the EVSE 110 could determine to operate at the power generation level of the source 104 or below without the energy monitoring system 902.

FIG. 11 is a flowchart of a method 1100 of managing an EVSE. The method 1100 begins at operation 1102. In operation 1102, electrical power is received to operate at full power. For example, the electric grid 106 supplies power to the bus 120, and the EVSE 110 operates at full power using the power the electric grid 106 supplies.

In operation 1104, a frequency of electrical power is monitored. For example, the EVSE 110 monitors the frequency of electrical power supplied via the bus 120. The EVSE 110 may monitor the frequency according to the methods described above.

In operation 1106, it is determined that the generator system is supplying power based on the frequency. For example, the EVSE 110 determines the generator system 102 is supplying power because the frequency of the power drops below two Hz of the nominal frequency for a period. The EVSE 110 may determine the generator system 102 is supplying power according to the methods described above.

In operation 1108 portion of the electrical load is shed to operate at a percentage of full power. For example, the EVSE 110 sheds a portion of the electrical load to operate at a percentage of full power in response to determining the generator system 102 is supplying power. In some examples, the EVSE 110 sheds the full load and operates at zero percent of full power.

In operation 1110, it is determined to increase the percentage of full power based on the frequency. For example, the EVSE 110 determines the generator system 102 is no longer supplying power and the electric grid 106 is supplying power based on the frequency. In another example, the EVSE 110 determines the generator system 102 can accommodate the EVSE 110 operating at an increased percentage of full power.

In operation 1112, the percentage of full power is increased. For example, the EVSE 110 increases the percentage of full power in response to determining to increase the percentage of full power in operation 1110. In an example, the EVSE 110 determines to operate at one hundred percent of full power.3

Figure 12:
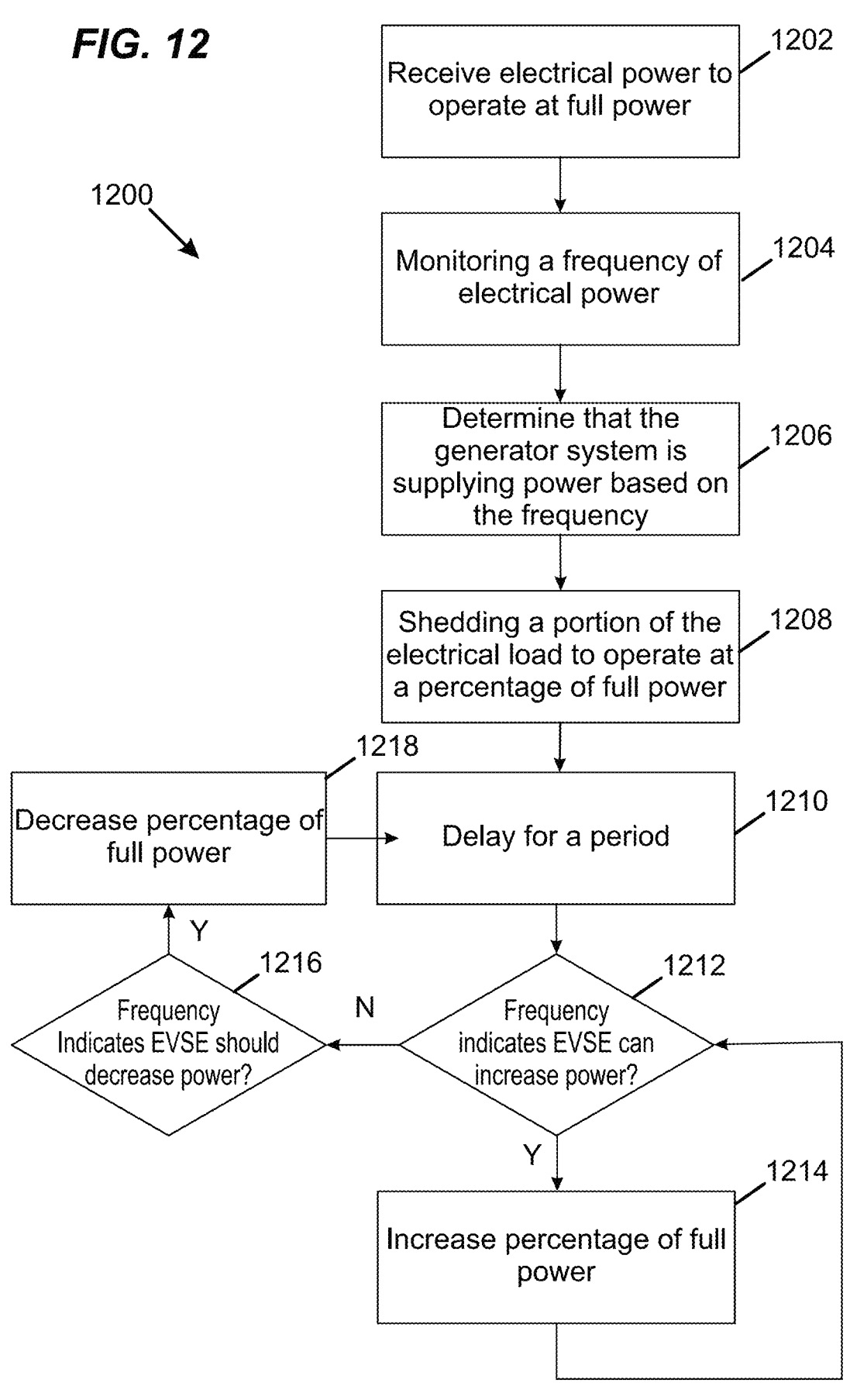
FIG. 12 is a flowchart of another example method of managing an EVSE.

FIG. 12 is a flowchart of another example method 1200 of managing an EVSE. The method 1200 begins at operation 1202. In operation 1202, electrical power is received to operate at full power. For example, the electric grid 106 supplies power to the bus 120, and the EVSE 110 operates at full power using the power the electric grid 106 supplies.

In operation 1204, a frequency of electrical power is monitored. For example, the EVSE 110 monitors the frequency of electrical power supplied via the bus 120. The EVSE 110 may monitor the frequency according to the methods described above.

In operation 1206, it is determined that the generator system is supplying power based on the frequency. For example, the EVSE 110 determines the generator system 102 is supplying power because the frequency of the power drops below two Hz of the nominal frequency for a period. The EVSE 110 may determine the generator system 102 is supplying power according to the methods described above.

In operation 1208 portion of the electrical load is shed to operate at a percentage of full power. For example, the EVSE 110 sheds a portion of the electrical load to operate at a percentage of full power in response to determining the generator system 102 is supplying power. In some examples, the EVSE 110 sheds the full load and operates at zero percent of full power. In other examples, the EVSE 110 operates at a low percentage of full power to evaluate the impact of the EVSE 110 operating while the generator system 102 is operating.

In operation 1210, adjustment of the EVSE 110 is delayed for a period. For example, the EVSE 110 does not adjust the percentage of full power the EVSE 110 is operating at for the period. The period may be five minutes in some examples.

In decision 1212, it is determined whether the frequency indicates the EVSE can increase power. For example, the EVSE 110 monitors the frequency and determines whether the EVSE 110 can increase the percentage of full power the EVSE 110 is operating at. If the EVSE 110 determines the EVSE 110 can increase the percentage of full power in decision 1212, the method 1200 proceeds to operation 1214. In operation 1214, the percentage of full power increases. For example, the EVSE 110 can increase the percentage of full power (e.g., a five percent increase, a ten percent increase, a twenty-five percent increase, etc.). The method may then continue to decision 1212 again, and the EVSE 110 may determine if the frequency indicates the EVSE 110 can again increase the percentage of power.

If it is determined in decision 1216 that the frequency does not indicate the frequency indicates the EVSE can increase power, the method 1200 may proceed to decision 1216. In decision 1216, it is determined if the frequency indicates that the EVSE 110 should decrease the percentage of full power. If the frequency indicates that the EVSE 110 should decrease full power, the method proceeds to operation 1218. In operation 1218, the percentage of full power is decreased. For example, the EVSE 110 may decrease the percentage of full power (e.g., a five percent decrease, a ten percent decrease, a twenty-five percent decrease, etc.). The method 1200 may then proceed back to operation 1210 and delay for the period. In some examples, the duration of the period can change during subsequent returns to operation 1210.

If it is determined in decision 1216 that the EVSE 110 does not need to decrease power, the method 1200 may conclude and the EVSE 110 may operate at the final percentage of full power. Thus, the method may end at any percentage of full power that the generator system 102 can accommodate. The EVSE 110 may increase to operate at full power when the generator system 102 stops operating, and power is again received from the electric grid 106.

Referring to the above process generally, it is noted that certain aspects may be performed in different orders. Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The example embodiments described herein may be implemented using hardware, software, or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more memory cards (e.g., flash memory) for program and data storage, and a random access memory, for temporary data and program instruction storage. From a software standpoint, a CPU typically includes software resident on a storage media (e.g., a memory card), which, when executed, directs the CPU in performing transmission and reception functions. The CPU software may run on an operating system stored on the storage media, such as, for example, UNIX or Windows, iOS, Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, which may include an article of manufacture on a machine accessible or non-transitory computer-readable medium (i.e., also referred to as "machine readable medium") having instructions. The instructions on the machine accessible or machine readable medium may be used to program a computer system or other electronic device. The machine-readable medium may include, but is not limited to, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various example embodiments have been described above, it should be understood that they have been presented by way of example, and not limitation. It will be apparent to persons skilled in the relevant art(s) that various changes in form and detail can be made therein. Thus, the present invention should not be limited by any of the above-described example embodiments but should be defined only in accordance with the following claims and their equivalents.

What is claimed is:

1. A method of managing an Electric Vehicle (EV) Supply Equipment (EVSE) for use with a generator system, the method comprising:
   receiving electrical power to operate at full power;
   monitoring a frequency of electrical power;
   determining that the generator system is supplying power based on the frequency;
   in response to determining the generator system is supplying power, shedding a portion of an electrical load of the EVSE to operate at a percentage of full power;
   determining to increase the percentage of full power based on the frequency; and
   in response to determining to increase the percentage of full power, increasing the percentage of full power.

2. The method of claim 1, wherein the electrical load is used to charge an EV.

3. The method of claim 1, wherein determining the generator system is supplying power based on the frequency comprises:
   determining the frequency is any one of (i) below a minimum threshold frequency for a first period, or (ii) below an extreme threshold frequency for a second period.

4. The method of claim 1, wherein determining to increase the percentage of full power based on the frequency comprises:
   sampling the frequency, wherein sampling the frequency comprises sampling a sample amount;
   determining all of the samples of the frequency have a magnitude of frequency dither at or below a first frequency dither threshold; and
   determining a second portion of the samples of the frequency have the magnitude of frequency dither at or below a second frequency dither threshold.

5. The method of claim 1, wherein determining the generator system is supplying power based on the frequency comprises:
   determining a subperiod of a plurality of subperiods is below a minimum threshold amount of zero-crossings;
   evaluating one or more previous subperiods of the subperiod to determine whether any of the previous subperiods are below an extreme frequency threshold; and
   evaluating subsequent subperiods of the subperiod to determine whether the subsequent periods are below the minimum threshold.

6. The method of claim 1, wherein the portion of the electrical load is the full electrical load, and the percentage of full power is zero percent.

7. The method of claim 1, wherein determining to increase the percentage of full power based on the frequency comprises determining the generator system is no longer supplying power based on the frequency.

8. A method of managing Electric Vehicle (EV) Supply Equipment (EVSE) power supply from a generator system, the method comprising:

receiving electrical power to operate at full power;

monitoring a frequency of electrical power;

determining that the generator system is supplying power based on the frequency;

in response to determining the generator system is supplying power, shedding a portion of an electrical load of the EVSE to operate at a percentage of full power;

delaying increasing the percentage of full power for a period; and after the period, increasing the percentage of full power.

9. The method of claim 8, further comprising:

determining the frequency is below a threshold after increasing reception of electrical power;

in response to determining the frequency is below the threshold, shedding a second portion of the electrical load to operate at a second percentage of full power;

delaying monitoring the frequency for a second period;

after the second period, determining the frequency is above a second threshold; and in response to determining the frequency is above the second threshold, again increasing the percentage of full power.

10. The method of claim 8, wherein increasing the percentage of full power comprises:

increasing the percentage of full power by a second percentage;

determining the frequency is above a threshold; and in response to determining the frequency is above the threshold, increasing the percentage of full power by a third percentage.

11. The method of claim 10, wherein increasing the percentage of full power further comprises:

again determining the frequency is above the threshold; and in response to determining the frequency is again above the threshold, again increasing the percentage of full power by a fourth percentage.

12. The method of claim 10, further comprising:

determining the frequency is below the threshold after increasing the percentage of full power by the third percentage; and in response to determining the frequency is below the threshold, reducing the percentage of full power by a fourth percentage.

13. A system for managing an Electric Vehicle (EV) Supply Equipment (EVSE) for use with a generator system, the system comprising:

the generator system, wherein the generator system is operable to generate and supply power; and the EVSE, comprising:

a controller operable to:

cause the EVSE to receive electrical power to operate at full power;

receive an instruction to shed an electrical load of the EVSE and reduce the electrical power received based on a frequency of electrical power powering the EVSE;

determine a portion of the electrical load to shed based on the instruction;

cause the EVSE to operate at a percentage of full power;

delay increasing the percentage of full power for a period; and after the period, increase the percentage of full power.

14. The system of claim 13, wherein the system further comprises a power monitor operable to monitor the frequency of the electrical power powering the EVSE.

15. The system of claim 14, wherein the power monitor sends the instruction to operate at the percentage of full power.

16. The system of claim 13, further comprising an energy management module operable to:

monitor the frequency of the electrical power powering the EVSE; and send the instruction to shed the electrical load.

17. The system of claim 13, further comprising an energy monitoring system operable to:

monitor the frequency of the electrical power powering the EVSE; and send the instruction to operate at the percentage of full power.

18. The system of claim 17, further comprising a source operable to supply power to the EVSE, wherein:

the energy monitoring system is operable to send an amount of power the source is able to supply the EVSE; and the controller is operable to cause the EVSE to operate at a new percentage of full power equal to or less than the amount of power the source is able to supply the EVSE.

19. The system of claim 13, further comprising a user device, wherein:

the EVSE further comprises a wireless communication module operable to send information to the user device and receive information from the user device;

the controller is operable to send information associated with the EVSE to the user device via the wireless communication module; and the user device, using the information associated with the EVSE, is operable to:

display a graphical user interface comprising any one of (i) a charge load indicator, (ii) a charge selectable input, (iii) a connection indicator, (iv) a charging status indicator, (v) a menu, (vi) a lock-out mode input, (vii) a priority mode input, (viii) a priority level input, (ix) an initial load shed target input, (x) an EVSE disconnect input, (xi) an EVSE reconnect input, or (xii) any combination of (i)-(xi).

20. The system of claim 19, wherein:

the user device is operable to send a command to the EVSE to control the operation of the EVSE; and the controller is operable to receive the command via the wireless communication module and adjust the operation of the EVSE by any one of (i) changing the percentage of full power the EVSE is operating at, (ii) shedding the electrical load, or (iii) attempting to reconnect to power.

* * * * *